(12) United States Patent
Reimer (10) Patent No.: US 12,488,675 B2
(45) Date of Patent: Dec. 2, 2025

(54) PREMISES MONITORING SYSTEMS WITH ASSESSMENT AND CORRECTIVE ACTION FUNCTIONALITY

(71) Applicant: The ADT Security Corporation, Boca Raton, FL (US)

(72) Inventor: Mark Reimer, Denver, CO (US)

(73) Assignee: The ADT Security Corporation, Boca Raton, FL (US)

( * ) Notice: Subject to any disclaimer, the term of this patent is extended or adjusted under 35 U.S.C. 154(b) by 384 days.

(21) Appl. No.: 18/090,978

(22) Filed: Dec. 29, 2022

(65) Prior Publication Data

US 2024/0221491 A1 Jul. 4, 2024

(51) Int. Cl.
*G08B 25/10* (2006.01)
*H04W 12/00* (2021.01)
*H04W 84/18* (2009.01)

(52) U.S. Cl.
CPC .......... *G08B 25/10* (2013.01); *H04W 12/009* (2019.01); *H04W 84/18* (2013.01)

(58) Field of Classification Search
CPC ..... G08B 25/10; H04W 12/009; H04W 84/18
See application file for complete search history.

(56) References Cited

U.S. PATENT DOCUMENTS

| | | | |
|---|---|---|---|
| 10,194,276 | B1 | 1/2019 | Singamsetty et al. |
| 2006/0253712 | A1 | 11/2006 | Armingaud et al. |
| 2008/0219239 | A1 | 9/2008 | Bell et al. |
| 2008/0300046 | A1* | 12/2008 | Gagner ................... G07F 17/32 463/25 |
| 2011/0110345 | A1* | 5/2011 | Heidari ................. H04W 40/06 370/338 |
| 2014/0266678 | A1* | 9/2014 | Shapiro .............. G05B 23/0232 340/514 |
| 2016/0034010 | A1* | 2/2016 | Gettings ................... G06F 1/26 713/330 |
| 2016/0034359 | A1 | 2/2016 | Cabrera et al. |
| 2018/0011461 | A1* | 1/2018 | Camarasa .............. G08B 25/10 |
| 2020/0136956 | A1* | 4/2020 | Neshat ..................... H04L 45/28 |
| 2020/0235607 | A1 | 7/2020 | Kanarellis et al. |
| 2020/0244734 | A1 | 7/2020 | Mendiola et al. |
| 2021/0211349 | A1* | 7/2021 | Grant .................. H04L 41/0866 |
| 2021/0288868 | A1 | 9/2021 | Yao |
| 2021/0409302 | A1 | 12/2021 | Kahn |
| 2022/0212793 | A1 | 7/2022 | Rezvani |
| 2023/0156552 | A1* | 5/2023 | Robertson ................ H04B 3/56 370/331 |

FOREIGN PATENT DOCUMENTS

| | | |
|---|---|---|
| WO | 2020041371 A1 | 2/2020 |
| WO | 2022040191 A1 | 2/2022 |

\* cited by examiner

*Primary Examiner* — Sun Jong Kim
(74) *Attorney, Agent, or Firm* — Weisberg I.P. Law, P.A.

(57) ABSTRACT

An assessment device for a premises security system that is configured to monitor a premises is provided. The assessment device includes processing circuitry configured to monitor a metric associated with a mesh network or a power level associated with the premises security system, determine that the metric fails to meet a system health criteria, in response to determining that the metric fails to meet the system health criteria, perform at least one assessment of the premises security system, and determine at least one action to implement to cause the metric to meet the system health criteria where the at least one action is based on the at least one assessment of the premises security system.

20 Claims, 7 Drawing Sheets

PREMISES MONITORING SYSTEMS WITH ASSESSMENT AND CORRECTIVE ACTION FUNCTIONALITY

TECHNICAL FIELD

The disclosure relates to methods and systems for dynamic assessment and corrective action in a premises monitoring system.

BACKGROUND

User adoption of smart home technology continues to increase as more products are introduced to users. For example, more devices are being introduced to users for premises security systems and/or home automation systems in which these devices add to and/or improve the functionality of the underlying system. These devices may be configured to use the user's wireless network for communication. When a user changes their service set identifier (SSID) (wireless network name) and/or pre-shared key (PSK) (e.g., password), the connected devices are immediately kicked off the network. For connected devices with a screen (e.g., phone, tablet, smart TV, smart thermostat) the customer may be notified by the device by displaying a message on the screen, and prompting the user to provide the new wireless network information. Users may not notice that other devices have had their network connectivity terminated.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

As user adoption of smart home technology continues to increase more devices are being introduced to users for premises security systems and/or home automation systems in which these devices add to and/or improve the functionality of the underlying system. However, some of these devices may require troubleshooting that may be complex to some users. For example, for connected devices with a screen (e.g., phone, tablet, smart TV, smart thermostat), the customer may be notified by displaying a message on the screen that the device is no longer connected to a wireless network due to, for example, a user changing the wireless network name and/or password of the wireless network. The message may prompt the user to provide the new wireless network information. However, for devices without a screen, it may become more challenging to reconnect these devices, as users can go for days without noticing there is a problem with these devices that requires their attention. It may not be until the user needs a function provided by the device that the user realizes the device has been disconnected and not working for days. For example, when an event occurs at the user's premises, the customer may attempt to access the video from their security camera (i.e., a type of smart home technology device). However, the user may discover that the security camera stopped recording when it disconnected from the wireless network due to the change in the wireless network name and/or password.

This may lead to a frustrating experience for the user as the user may not have the technical competency to anticipate and/or diagnose the problem with the device. Further, the user may find it difficult to get these devices back online because the devices may not communicate an informative message to help guide the user to reconnect the device.

Some systems rely on the users to be technically competent with the ability to diagnose and resolve problems with limited support information. However, these users may call their service providers for help with the problem and, depending on the knowledge and diagnostics capabilities of the support provider, the problem may get fixed remotely, or require an appointment for a service technician to fix the problem on-site. This may further add to customer frustration and high service provider costs.

The present disclosure may solve the problems with existing systems by, for example, monitoring a list of health-checks (i.e., system health criteria) and may automatically correct problems to restore the health and connectivity of its runtime environment with no or minimal involvement from the user. The system stores a variable list of health checks that are continuously or periodically monitored to measure if the values of a metric are within a tolerance range. When a health check fails, the system may notify an internal (running inside the system) and an external (cloud-based) monitoring service. The internal monitoring service (e.g., software operating in assessment device) performs an assessment of the notification and determines if a corrective action is found in a list of corrective actions. If a corrective action is found, the service automatically performs the step(s) to restore the monitored metrics to be back within tolerance. After a predefined amount of positive health check results for this metric, the internal monitoring service may notify the external (cloud-based) monitoring service that the health of this metric has been restored.

Before describing in detail exemplary embodiments, it is noted that the embodiments may reside in combinations of apparatus components and processing steps related to dynamic assessment and corrective action in a premises monitoring system. Accordingly, components have been represented where appropriate by conventional symbols in the drawings, focusing on only those specific details that facilitate understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a," "an" and "the" are intended to include the plural forms as well, unless the context clearly indicates otherwise. It will be further understood that the terms "comprises," "comprising," "includes," "including," "has," and "having," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Figure 1:
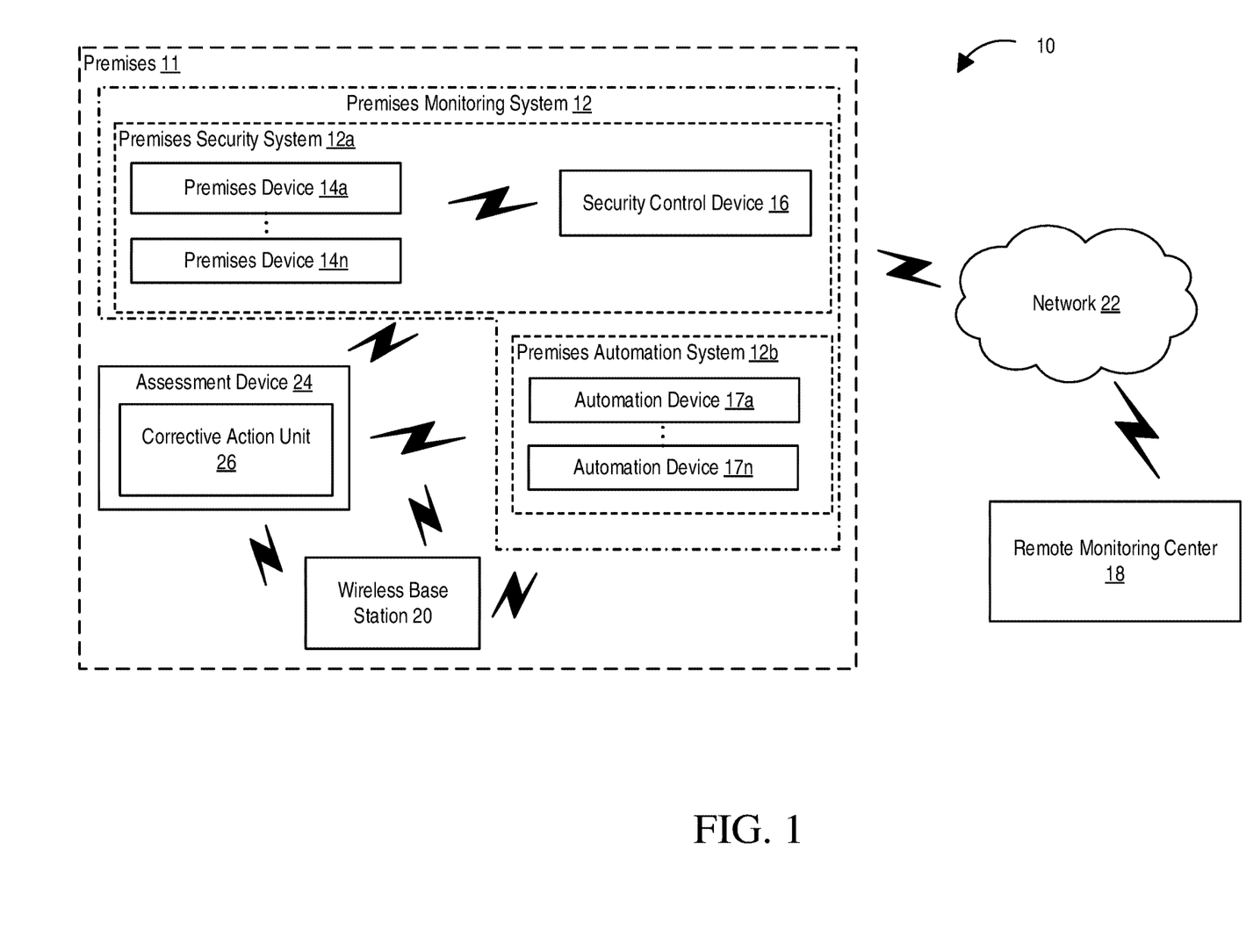
FIG. 1 is an example system according to the principles of the present disclosure.

Referring to the drawing figures, in which like elements are referred to by like reference numerals, there is shown in FIG. 1 a diagram of an example system 10 including a premises monitoring system 12 including a premises security system 12a and/or premises automation system 12b positioned at premises 11. Premises security system 12a includes one or more premises devices 14a-14n (collectively referred to as premises device 14) that are in communication with a security control device 16 that is configured to control and/or manage the premises security system 12a. That is, security control device 16 may be configured to perform various functionality associated with premises security system 12a such as, for example, receiving data (e.g., sensor data) from premises device 14a while monitoring premises 11 and trigger an alarm based on the data. Security control device 16 may be configured to communicate with remote monitoring center 18 via network 22.

Further, each premises device 14 may include one or more sensors, detectors, control panels, control devices, images capture devices, life safety devices and other devices. For example, the types of sensors may include various life safety related sensors, such as motion sensors, fire sensors, carbon monoxide sensors, flooding sensors and contact sensors, among other sensor types. Image capture devices may include digital cameras and/or video cameras, among other image capture devices.

Premises automation system 12b includes one or more automation devices 17a-17n for performing one or more premises automation functions (e.g., lifestyle functions), as described herein. For example, further, automation device 17 may include one or more lifestyle devices and other devices such as a control device that may be configured to control as aspect of the premises 11. The control devices may include, for example, devices configured to adjust at least one premises setting such as lighting, temperature, energy usage, door lock and power settings, among other settings associated with the premises or devices on the premises.

Various entities associated with premises 11 may be configured to communicate with each other via one or more networks such as mesh network. For example, automation devices 17a-17n may participate in a mesh network for communicating with each other, wireless base station 20 and/or network 22. Wireless base station 20 is configured to provide access to and from network 22. Wireless base station 20 may be a wireless access point, wireless router, etc.

Network 22 (which may refer to a plurality of networks), which may be configured to provide direct/indirect communication, e.g., wired and/or wireless communication, between any two or more components of system 10, e.g., premises security system 12a, premises automation system 12b, premises device 14, automation device 17, remote monitoring center 18, assessment device 24, wireless base station 20, etc. Although network 22 is shown as an intermediate network between components/devices of system 10, any component/device may communicate directly with any other component/device of system 10 such as, for example, via a mesh network.

Although premises security system 12a and premises automation system 12b are shown as comprising respective premises devices 14 and/or automation devices 17, premises security system 12a and premises automation system 12b are not limited to comprising only premises devices 14 and/or automation devices 17 and may include additional devices. System 12 may refer to any system, e.g., a premises security system 12a, a premises automation system 12b, a security and automation system such as a home security and automation system.

System 10 may also include a remote monitoring center 18, which may be capable of performing certain monitoring, configuration and/or control functions associated with system 10. For example, with respect to fire and carbon monoxide detectors, monitoring data is sent to remote monitoring center 18 and may include information regarding carbon monoxide readings, smoke detection readings, sensor location and time of readings, among other information related to these detectors that may be communicated with remote monitoring center 18.

Further, system 10 may include assessment device 24, which may refer to a device configurable for direct and/or indirect communication with one or more of premises security system 12a, premises automation system 12b, remote monitoring center 18, or any other component of system 10. Assessment device 24 includes corrective action unit 26 that is configured to perform one or more assessment device 24 functions described herein such as, for example, with respect to dynamic assessment and corrective action in a premises monitoring system 12.

Note further that functions described herein as being performed by assessment device 24 may be distributed over a plurality of devices and/or systems. In other words, the functions of the assessment device 24 described herein are not limited to performance by a single physical device and can instead be distributed among several physical devices. Similarly, functions described herein as being performed by one or more of premises security system 12a, premises automation system 12*b*, and remote monitoring center 18 may be distributed over devices and/or systems, respectively.

Figure 2:
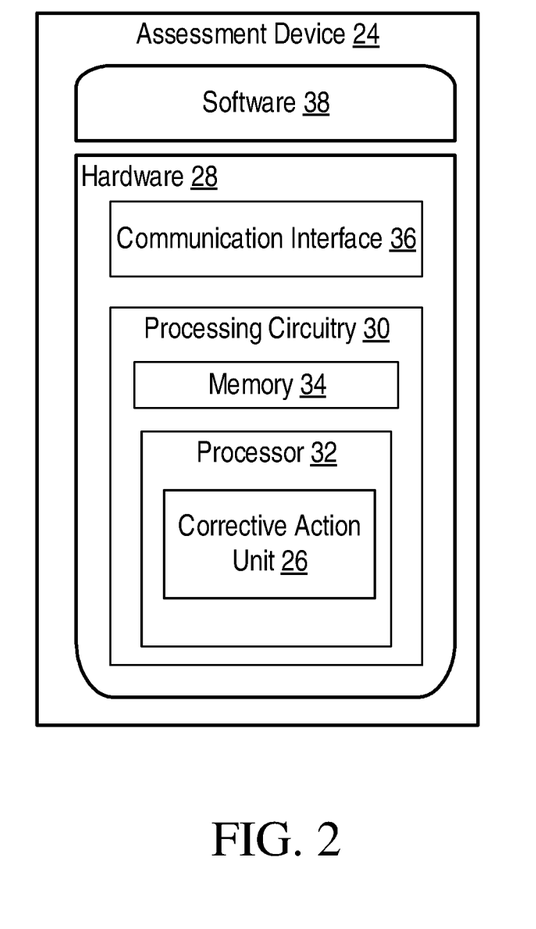
FIG. 2 is a block diagram of the assessment device according to the principles of the present disclosure.

Example implementations, in accordance with embodiments of system 10 discussed in the preceding paragraphs will now be described with reference to FIG. 2.

The assessment device 24 includes hardware 28. The hardware 28 may include processing circuitry 30. The processing circuitry 30 may include a processor 32 and a memory 34. In particular, in addition to or instead of a processor, such as a central processing unit, and memory, the processing circuitry 30 may comprise integrated circuitry for processing and/or control, e.g., one or more processors, processor cores, field programmable gate arrays (FPGAs), and/or application specific integrated circuits (ASICs) adapted to execute instructions. The processor 32 may be configured to access (e.g., write to and/or read from) the memory 34, which may comprise any kind of volatile and/or nonvolatile memory, e.g., cache and/or buffer memory, random access memory (RAM), read-only memory (ROM), optical memory, and/or erasable programmable read-only memory (EPROM). Further, memory 34 may be configured as a storage device.

Hardware 28 of assessment device 24 may include communication interface 36 enabling it to communicate with any component and/or device of system 10. For example, communication interface 36 may be configured for establishing and maintaining at least a wireless or wired connection with any component or device of system 10, such as premises security system 12*a*, premises automation system 12*b*, wireless base station 20, etc. The communication interface 36 may be formed as or may include, for example, one or more radio frequency (RF) transmitters, one or more RF receivers, and/or one or more RF transceivers.

Assessment device 24 further has software 38 stored internally in, for example, memory 34, or stored in external memory (e.g., database, storage array, network storage device, etc.) accessible by the assessment device 24 via an external connection. Software or software application 38 may include any software or program configured to perform the steps or processes of the present disclosure, e.g., steps or processes related to dynamic assessment and corrective action in a premises monitoring system 12.

The processing circuitry 30 may be configured to control any of methods and/or processes described herein and/or to cause such methods, and/or processes to be performed, e.g., by assessment device 24. Processor 32 corresponds to one or more processors 32 for performing assessment device 24 functions described herein. The memory 34 is configured to store data and/or files such as premises system data and/or other information/data described herein. In some embodiments, the software 38 may include instructions that, when executed by the processor 32 and/or processing circuitry 30, causes the processor 32 and/or processing circuitry 30 to perform the processes described herein with respect to assessment device 24. For example, processing circuitry 30 of assessment device 24 may include corrective action unit 26, which may be configured to perform any of the processes, steps, or functions described herein such as, for example, process, steps or functions related to dynamic assessment and corrective action in a premises monitoring system 12. Further, while assessment device 24 is described being a separate device, one or assessment device 24 functions may be performed by the device being assessed such that corrective action unit 26 is implemented in a premises device 14, automation device 17, etc.

Figure 3:
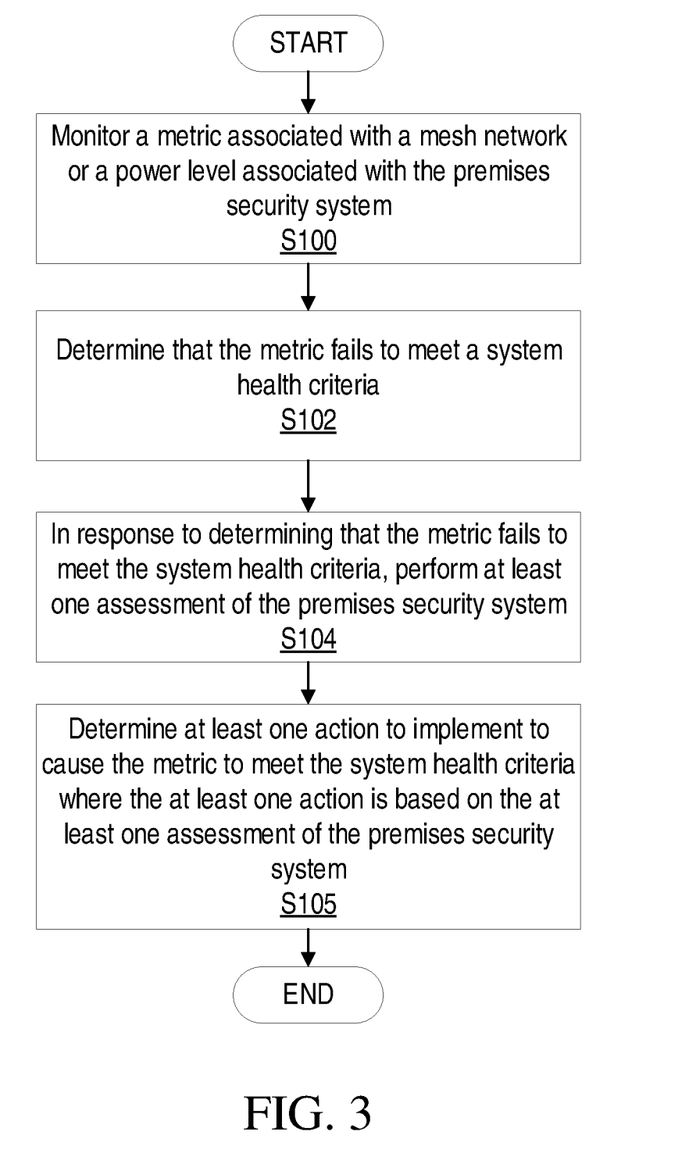
FIG. 3 is a flowchart of an example process according to the principles of the present disclosure.

FIG. 3 is a flowchart of an example process implemented by assessment device 24 according to some embodiments of the present disclosure. One or more blocks described herein may be performed by one or more elements of assessment device 24, such as by one or more of processing circuitry 30 (including the correction action unit 26) and/or processor 32 and/or communication interface 36. Assessment device 24 is configured to monitor (Block S100) a metric associated with a mesh network or a power level associated with the premises security system 12, as described herein. Assessment device 24 is configured to determine (Block S102) that the metric fails to meet a system health criteria, as described herein. Assessment device 24 is configured to, in response to determining that the metric fails to meet the system health criteria, perform (Block S104) at least one assessment of the premises security system 12, as described herein. Assessment device 24 is configured to determine (Block S105) at least one action to implement to cause the metric to meet the system health criteria where the at least one action is based on the at least one assessment of the premises security system 12, as described herein.

According to one or more embodiments, the at least one action comprises modifying a setting of the premises security system 12 to generate a modified setting where the modified setting is configured to cause the metric to meet the system health criteria.

According to one or more embodiments, the metric is a change metric indicating a change in the mesh network, and where the processing circuitry 30 is configured to perform the at least one assessment of the premises security system 12 by at least determining that a device of the premises security system 12 has been added or removed to the mesh network, and where the at least one action comprises rebuilding a routing table for the mesh network.

According to one or more embodiments, the metric is a frame error metric indicating a frame error rate in the mesh network associated with the premises security system 12, and where the processing circuitry 30 is configured to perform the at least one assessment of the premises security system 12 by at least determining that a communication link in the mesh network is no longer operational, and the at least one action comprises logically removing the communication link from a routing table of the mesh network and rebuilding the routing table of the mesh network.

According to one or more embodiments, the metric is a power metric indicating a power level of a battery; and where the processing circuitry 30 is configured to perform the at least one assessment by at least: determining a power level of the battery has changed by a predefined amount and determining an ambient temperature of the premises.

According to one or more embodiments, the at least one action comprises generating a notification indicating that the battery requires replacement.

According to one or more embodiments, the at least one action comprises: generating a prompt for information associated with the at least one assessment and modifying a setting of the premises security system 12 based on the information.

According to one or more embodiments, the metric is a network noise metric configured to indicate a level of noise in the mesh network.

According to one or more embodiments, the at least one action comprises generating a prompt to perform a user action, the user action.

According to one or more embodiments, the user action comprises one of: moving a device associated with the premises security system 12 or replacing at least one battery in a device associated with the premises security system 12.

According to one or more embodiments, the metric is a wireless connectivity metric associated with a configured wireless network usable by the premises security system 12, and the at least one assessment of the premises security system 12 comprises: determining a logical identifier of the configured wireless network is no longer detectable, determining a medium access control (MAC) address associated with each logical identifier of each detectable wireless network, determining the MAC address of a detectable wireless network matches a stored MAC address associated with the logical identifier of the configured wireless network, and automatically connecting to the configured wireless network using an updated logical identifier associated with the MAC address.

According to one or more embodiments, the metric is a software error metric indicating, for example, a quantity of errors in operating system software associated with the premises security system 12. The at least one assessment of the premises security system 12 may include determining a state of a premises security system 12; in response to determining the premises security system 12 is in a disarmed state, reverting firmware of at least one device in the premises security system 12 to a previous configuration in which the metric met the system health criteria; and in response to determining the premises security system 12 is in an armed state, postponing the reversion of the firmware until the premises security system 12 is in the disarmed state.

According to one or more embodiments, the metric is a connectivity metric that indicates connectivity to a configured cellular network and the system health criteria includes a time period threshold for operational connectivity to the configured cellular network. The at least one assessment of the premises security system 12 may include performing a cellular network scan to detect cellular networks other than the configured cellular network; detecting a cellular network associated with an activated subscriber identity module (SIM) that is associated with the premises security system 12; causing activation of a cellular plan associated with the detected cellular network; causing deactivation of a cellular plan associated with the configured cellular network; and communicating using the detected cellular network according to the cellular plan.

Having described the general process flow of arrangements of the disclosure and having provided examples of hardware and software arrangements for implementing the processes and functions of the present disclosure, the discussion below provides details and examples of arrangements for dynamic assessment and corrective action in a premises monitoring system 12 (e.g., premise security system 12a and/or premises automation system 12b).

According to one or more embodiments, assessment device 24 attempts to keep one or more devices associated with premises monitoring system 12 connected to the wireless network (i.e., wireless base station). If the connection is lost, assessment device 24 diagnoses the problem and attempts to get the device reconnected. If the device is unable to reconnect because the SSID or PSK has changed and the assessment device 24 does not have the new SSID or password, then assessment device 24 prompts the user for this information and uses it to reconnect. Hence, the user receives a targeted notification indicating the specific information needed to restore connectivity.

Figure 4:
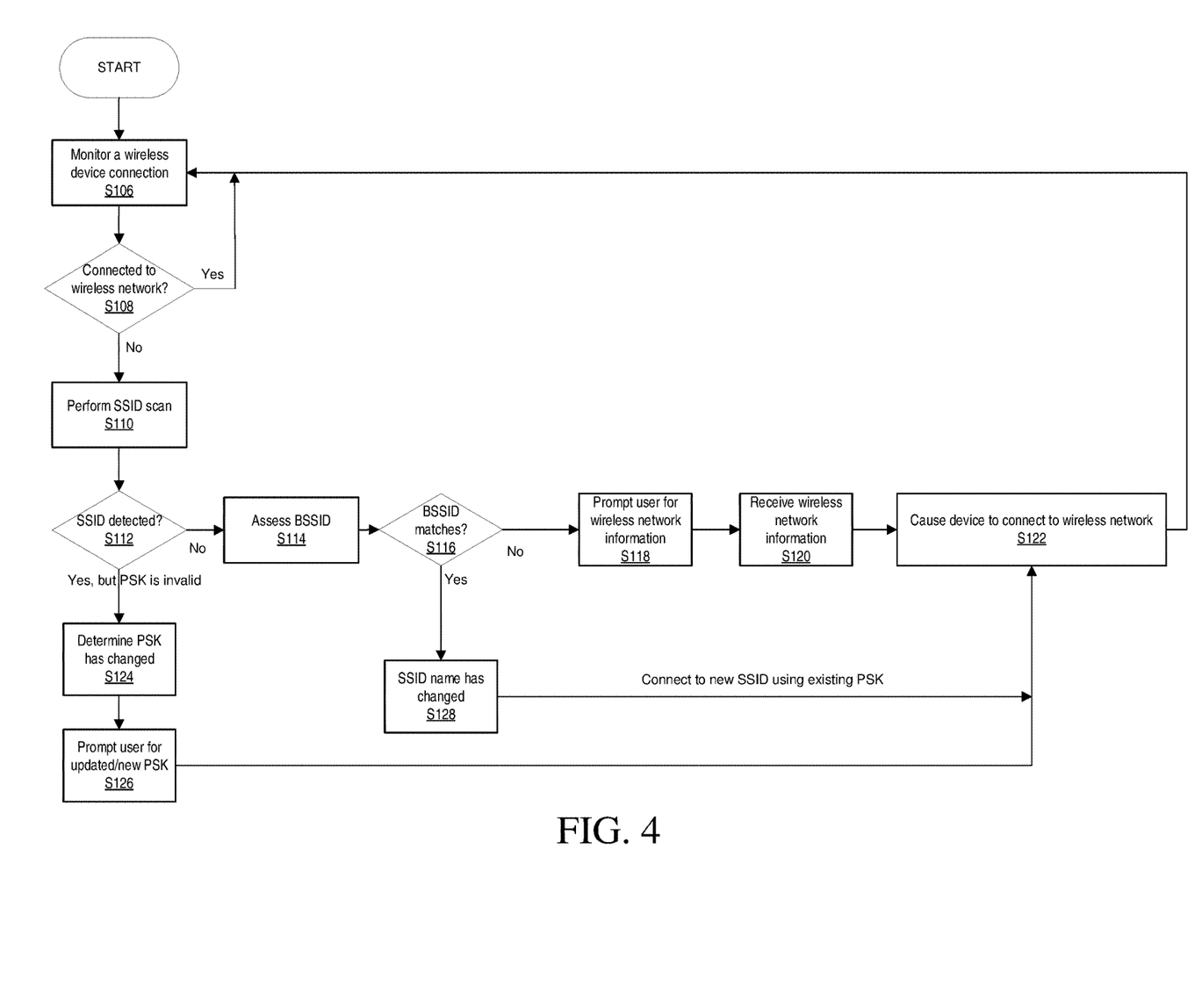
FIG. 4 is a flowchart of an example process associated with a wireless device connection according to the principles of the present disclosure.

FIG. 4 is flowchart of an example process according to one or more embodiments of the present disclosure. Assessment device 24 is configured to monitor (Block S106) a wireless device connection such as, for example, a WiFi connection to wireless base station 20. That is, assessment device 24 may be configured to monitor a metric, such as a wireless connectivity metric. Assessment device 24 is configured to determine (Block S108) whether the device is connected to the wireless network. If the device is connected to the wireless network, assessment device 24 may continue to monitor the wireless connectivity metric according to Block S106.

If the device is determined to not be connected to the wireless network, a SSID scan is performed (Block S110). For example, assessment device 24 may perform a SSID scan or may cause the device to perform the SSID scan. Assessment device 24 determines (Block S112) if the wireless network SSID has been detected. That is, assessment device 24 checks if the wireless network SSID that the device is currently configured to use has been detected. If the wireless network SSID has been detected and the PSK is valid, the process returns to perform the determination of Block S108. If the wireless network SSID has not been detected, assessment device 24 is configured to assess (Block S114) the basic service set identifier (BSSID) for each detected SSID from the scan. Assessment device 24 determines (Block S116) whether the BSSID matches the network SSID that the device is configured to use.

If the BSSID does not match, assessment device 24 prompts (Block S118) a predefined user for wireless network information. For example, assessment device 24 may prompt the user for the SSID and/or PSK to access the wireless network. Assessment device 24 is configured to receive (Block S120) the wireless network information from the user such as via a user's mobile device. After receiving the current wireless network information for access the wireless network, assessment device 24 causes (Block S122) the device to connect to the wireless network using the current wireless network information.

Referring back to Block S112, if the wireless network SSID is detected but the PSK being used to access the wireless network is invalid, assessment device 24 determines (Block S124) the PSK has changed and prompts (Block S126) the user for the updated or new PSK to access the wireless network. The process may then proceed to Block S120.

Referring back to Block S116, if the BSSID matches the configured SSID, assessment device 24 determines (S128) the SSID name has changed, and proceeds to connect to the wireless network using the new SSID name and existing PSK (Block S122).

Therefore, assessment device 24 is configured to dynamically assess wireless connectivity and take corrective action to help restore wireless connectivity to one or more devices of premises monitoring system 12.

According to one or more embodiments, assessment device 24 is configured to perform a software firmware health check to help ensure the software is in proper condition (e.g., the software does not exceed a predefined number of software errors/crashes), by watching for the occurrence of software errors, including but not limited to software crashes. For example, if the software crashes more than a pre-configured number of times within a predefined time window, assessment device 24 causes a device to automatically revert to the last-known stable configuration (e.g., last software configuration that did not exceed a predefined number of software errors within a predefined time window or that met a software error metric) and cause the device to restart to apply the last-known stable software firmware.

Figure 5:
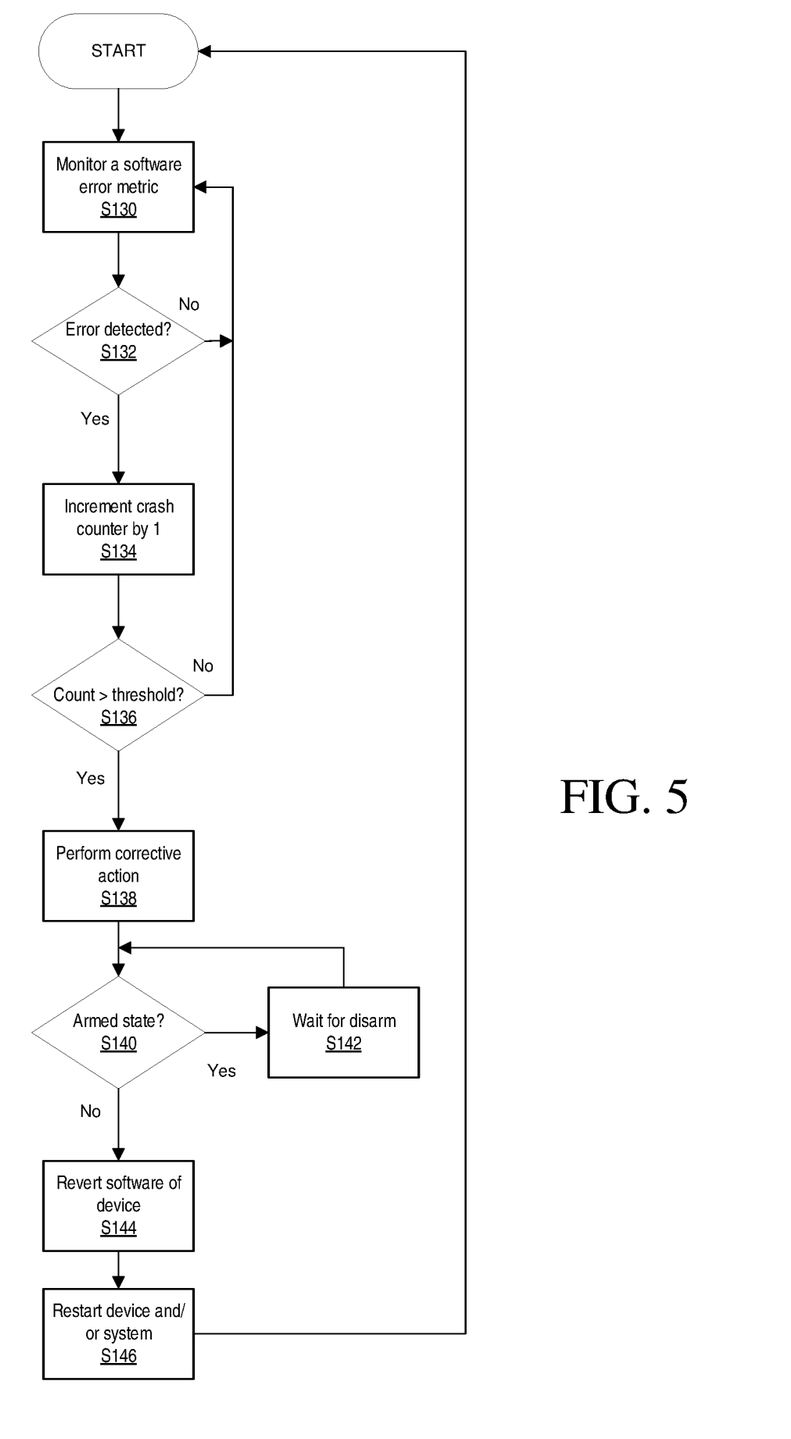
FIG. 5 is a flowchart of an example process associated with a software metric according to the principles of the present disclosure.

FIG. 5 is another example process according to one or more embodiments of the present disclosure. Assessment device 24 is configured to monitor (Block S130) a software error metric. For example, the software error metric may correspond to a predefined number of software errors within a predefined time window or period. Assessment device 24 determines (Block S132) whether a software error was detected. If a software error was not detected, the process returns to block S130. If a software error was detected, assessment device 24 increments (Block S134) a crash counter by 1 and determines (Block S136) whether the quantity of software errors exceeds a predefined threshold defined by a system health criteria. In one or more embodiments, the increments may vary based on the severity of the error.

If the quantity of software errors does not exceed the predefined threshold, the process proceeds to Block S130. If the quantity of software errors exceeds the predefined threshold, assessment device 24 determines (Block S138) to perform corrective action. Before taking corrective action and if the device associated with the software errors is part of premises security system 12a, assessment device 24 determines (Block S140) whether premises security system 12a is in an armed state. If the premises security system 12a is in an armed state, assessment device 24 waits (Block S142) until the premises security system 12a is disarmed. For example, assessment device 24 may wait a predefined time period or wait for a timer to expire before re-performing the determination of Block S140.

If the premise security system 12a is in a disarmed state, assessment device 24 causes (Block S144) the software (e.g., firmware) of the device to revert to a last known good configuration. For example, the last known good configuration may refer to a previously configuration where the quantity of software errors over a predefined time window or period did not exceed a predefined threshold defined by the system health criteria. After reverting the software of the device, assessment device 24 causes (Block S146) the device and/or system associated with the device to restart. For example, after reverting the firmware of premises device 14 back to a previous firmware version that met the system health criteria, assessment device 24 causes the premises device 14 and/or premise security system 12a to restart. Over time, low-power mesh networks, such as Z-Wave based mesh networks, may need to be repaired to maintain optimal connectivity and reliability. The mesh network health check and corrective action by assessment device 24 may be configured to monitor and help ensure the wireless network is in satisfactory condition (e.g., condition that meets a system health criteria). The assessment device may monitor a routing table for weak or broken routes between a controller device and other device; associations between devices for failed associations; network health for high interference, high level of retries, Tx/Rx frame errors, and/or checksum errors, and/or other change metrics or frame error metrics.

Figure 6:
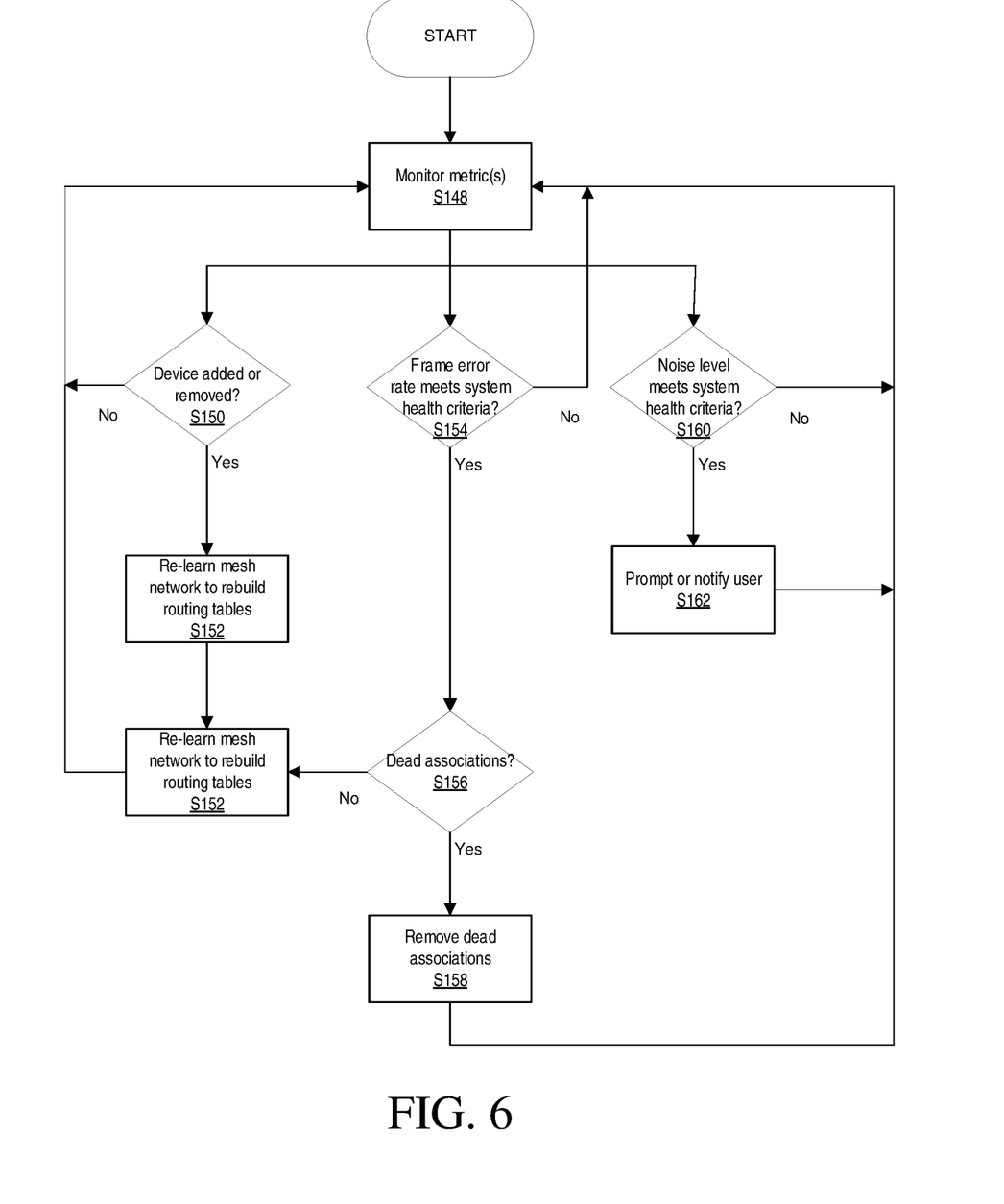
FIG. 6 is a flowchart of an example process associated with various metrics according to the principles of the present disclosure.

FIG. 6 is another example process according to one or more embodiments of the present disclosure. Assessment device 24 is configured to monitor (Block S148) one or more metrics associated with the health monitoring system. For example, assessment device 24 may monitor one or more of a change metric, frame error metric, etc. In one or more embodiments, a change metric indicates a change in a mesh network that is associated with the premises monitoring system 12. In one or more embodiments, a frame error metric indicates a frame error rate in a mesh network associated with the premises monitoring system 12.

Assessment device 24 determines (Block S150) whether a device has been added or removed from the mesh network. If a device has not been added or removed from the mesh network, the process performs proceeds to Blocks S148. If a devices has been added or removed from the mesh network, assessment device 24 re-learns (Blocks S152) the mesh network to rebuild routing tables for the mesh network.

Assessment device 24 determines (Block S154) whether the frame error rate meets a system health criteria. For example, assessment device 24 determines if the frame error rate or frame error metric meets a predefined threshold defined by the system health criteria. If the frame error rate meets the system health criteria, the process proceeds to Block S148. If the frame error rate does not meet the system health criteria, assessment device 24 determines (Blocks S156) dead associations in the mesh network. In one or more embodiments, dead associations may refer to one or more communication paths or links in the mesh network that are no longer valid or usable. If no dead associations are found, the process proceeds to re-learning the network to rebuild routing tables for the mesh network (Block S152). If dead associations are found, the dead associations are removed (Block S158) from the routing table(s), and the process proceeds to Block S148.

Assessment device 24 determines (Block S160) whether a noise level meets the system health criteria. For example, assessment device 24 determines whether a background noise level at a device exceeds a predefined noise level or threshold that is defined by the system health criteria. If the noise level meets the system health criteria (i.e., does not exceed a predefined threshold or level), the process proceeds to Block S148. If the noise level fails to meet the system health criteria, assessment device 24 prompts or notifies (Block S162) the user to move the device such as to reduce the noise level experienced by the device.

Devices, such as premises devices 14 and/or automation devices 17, may operate using power provided by batteries. According to various embodiments, the batteries may be monitored for low battery conditions, which may be defined by the system health criteria. However, devices installed in locations where the temperature varies more than a predefined range, may affect the battery level. Assessment device 24 is configured to monitor for low battery conditions, taking into account false-monitoring data due to temperature changes, and notifying a user or the service provider company that a battery needs to be replaced based on the system health criteria not being met.

Figure 7:
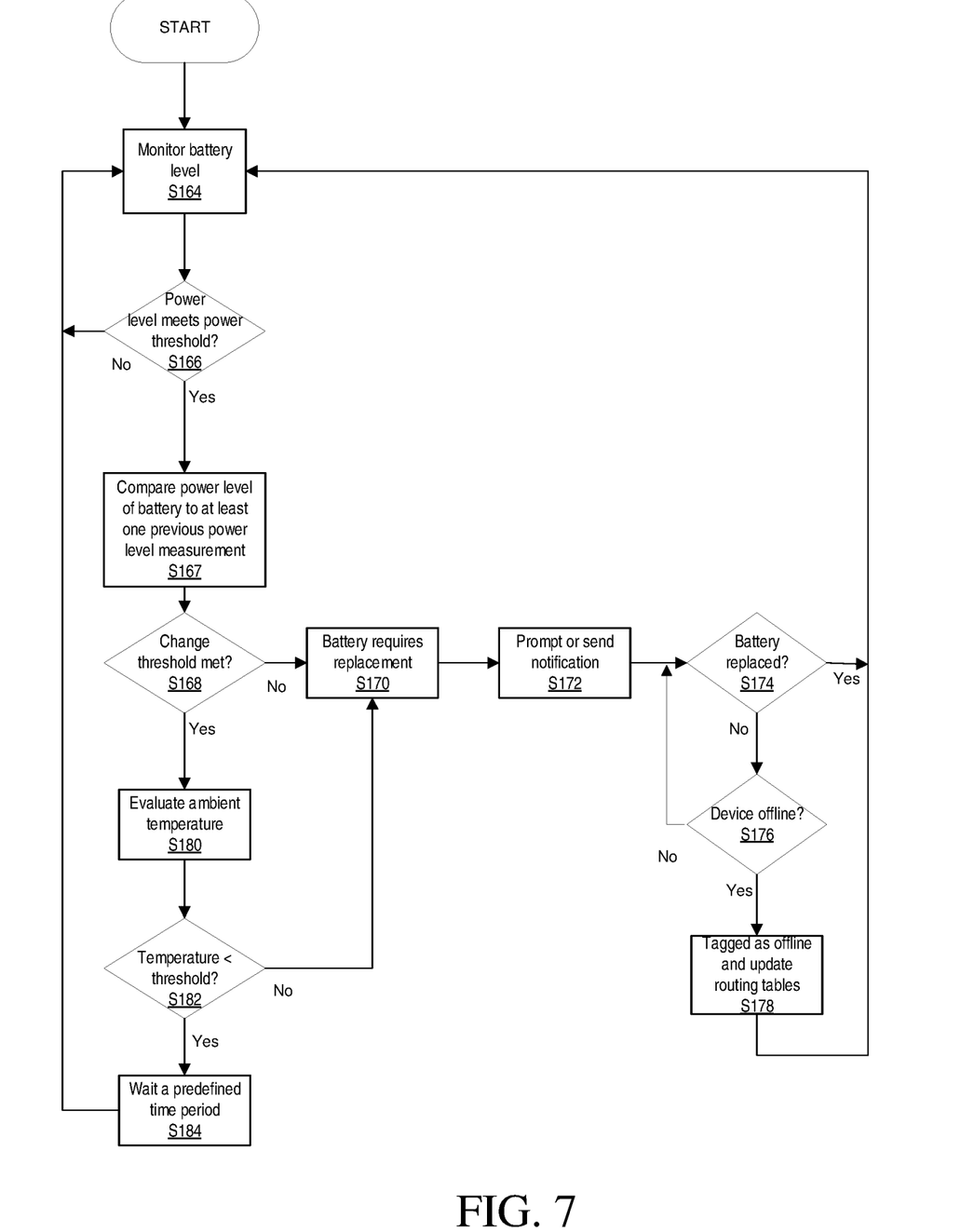
FIG. 7 is a flowchart of an example process associated with a battery level metric according to the principles of the present disclosure.

FIG. 7 is another example process according to one or more embodiments of the present disclosure. Assessment device 24 is configured monitor (Block S164) a battery level for a device associated with premise monitoring system 12, i.e., monitor power metric. Assessment device 24 determines (Block S166) whether a power level of a battery meets a power threshold defined in the system health criteria. If the power level of the battery meets the power threshold, the process proceeds to Block S164. If the power level of the battery does not meet the power threshold, assessment device 24 compares (Block S167) the power level of the battery to at least one previous power level measurement. For example, the previous power level measurement may correspond to a measurement performed several days prior.

Assessment device 24 determines (Block S168) whether the change in the power level of the battery indicated in the comparison meets a change threshold defined by the system health criteria. If the change in the power level of the battery does not meet a change threshold, assessment device 24 determines that the battery requires replacement (Block S170) and prompts or sends a notification indicating the required battery replacement to the user or other entity (Block S172).

Assessment device 24 determines (Block S174) whether the battery was replaced. If the battery was replaced, the process proceeds to Block S164. If the battery was not replaced, assessment device 24 determines (Block S176) whether the device is offline (e.g., not able to communicate with assessment device 24 or OFF) due to the power level of the battery being too low to operate the device. If the device is not offline, the process proceeds to step Block S174. If the device is offline, the device is tagged as offline and the routing tables are updated taking the removed of the device into consideration (Block S178).

Referring back to Block S168, if the change in the power level of the battery indicated in the comparison meets a change threshold defined by the system health criteria, assessment device 24 evaluates (Block S180) the ambient temperature at premises 11. For example, assessment device 24 may receive temperature data from premises device 14 and/or automation device 17. In another example, assessment device 24 may access the network to retrieve temperature data for the area where premises 11 is located. Assessment device 24 determines (Block 182) whether the temperature is below a temperature threshold defined by the system health criteria. If the temperature is not below the temperature threshold, the process proceeds to Block S170. If the temperature is below the temperature threshold, assessment device 24 waits a predefined time period before proceeding to Block S164 (Block S184). The predefined time may be tracked by, for example, a timer.

Assessment device 24 may be responsible for ensuring one or more devices in premises monitoring system 12 remain connected to the cellular network. For devices that have eSIM or multiple physical SIM cards, on the first device boot, the cellular health check by assessment device 24 will look for the best network connection (e.g., network with the strongest communication signal, least transmission errors, etc.), across carriers, and activate the corresponding SIM on the cellular network. When a device loses connectivity from the cellular network for a predefined time period, assessment device 24 may cause the device to re-scan all cellular networks and active the cellular plan that has the best network connection and may also deactivate the previous carrier's plan.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. Although it would be unduly repetitious and obfuscating to literally describe and illustrate every combination and subcombination of these embodiments, all embodiments can be combined in any way and/or combination.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the disclosure.

What is claimed is:

1. An assessment device for a premises security system that is configured to monitor a premises via a plurality of premises devices that include a first premises device, the assessment device comprising:
    processing circuitry configured to:
        monitor at least one metric associated with the premises security system, the at least one metric comprising a first metric that is associated with wireless connectivity between the first premises device and a wireless base station of the premises security system;
        determine that the first metric fails to meet a system health criteria due to a wireless connectivity failure between the first premises device and the wireless base station;
        in response to determining that the first metric fails to meet the system health criteria, perform a first assessment, the first assessment comprising:
            determine a logical identifier of a wireless mesh network is no longer detectable;
            determine a medium access control (MAC) address associated with a logical identifier of a detectable wireless network;
            determine the MAC address of the detectable wireless network matches to a stored MAC address associated with the logical identifier of the wireless mesh network; and
            automatically connect to the wireless mesh network using an updated logical identifier associated with the MAC address; and
        determine a first action to implement to correct the wireless connectivity failure between the first premises device and the wireless base station based on the first assessment.

2. The assessment device of claim 1, wherein the first action comprises modifying a setting of the premises security system to generate a modified setting, the modified setting being configured to correct the wireless connectivity failure between the first premises device and the wireless base station.

3. The assessment device of claim 1, wherein the at least one metric comprises a second metric; and
    the processing circuitry is further configured to:
        determine the second metric fails to meet the system health criteria, the second metric indicating a change in the wireless mesh network;
        in response to the determining that the second metric fails to meet the system health criteria, perform a second assessment of the premises security system by at least determining that a device of the premises security system has been added or removed to the wireless mesh network;
        determine a second action to implement to cause the second metric to meet the system health criteria, the second action comprising rebuilding a routing table for the wireless mesh network.

4. The assessment device of claim 1, wherein the at least one metric comprises a frame error metric indicating a frame error rate in the wireless mesh network associated with the premises security system; and
    the processing circuitry is configured to:
        determine that the frame error metric fails to meet the system health criteria;
        in response to determining that the frame error metric fails to meet the system health criteria, perform a link assessment of the premises security system by at least determining that a communication link in the wireless mesh network is no longer operational; and
        determine a routing table action to implement to cause the frame error metric to meet the system health criteria, the routing table action comprising:
            logically removing the communication link from a routing table of the mesh network; and
            rebuilding the routing table of the wireless mesh network.

5. The assessment device of claim 1, wherein the at least one metric comprises a power metric indicating a power level of a battery; and
    the processing circuitry is configured to:
        determine that the power metric fails to meet the system health criteria;
        in response to determining that the power metric fails to meet the system health criteria, perform a power assessment by at least:
            determining a power level of the battery has changed by a predefined amount; and
            determining an ambient temperature of the premises;
        determine a power action to implement based on the power assessment.

6. The assessment device of claim 5, wherein the power action comprises generating a notification indicating that the battery requires replacement.

7. The assessment device of claim 1, wherein the first action comprises:
    generating a prompt for information associated with the first assessment; and
    modifying a setting of the premises security system based on the information.

8. The assessment device of claim 7, wherein the at least one metric comprises a network noise metric that is configured to indicate a level of noise in the mesh network; and
    the processing circuitry is further configured to:
        determine that the network noise metric fails to meet the system health criteria;
        in response to the determining that the network noise metric fails to meet the system health criteria, perform a network noise assessment of the premises security system; and
        determine a network noise action to implement to cause the network noise metric to meet the system health criteria.

9. The assessment device of claim 1, wherein the logical identifier of the wireless mesh network is a service set identifier (SSID).

10. The assessment device of claim 1, wherein the logical identifier of the wireless mesh network is a pre-shared key (PSK).

11. A method implemented by an assessment device for a premises security system that is configured to monitor a premises via a plurality of premises devices that include a first premises device, the method comprising:
    monitoring at least one metric associated with the premises security system, the at least one metric comprising a first metric that is associated with wireless connectivity between the first premises device and a wireless base station of the premises security system;
    determining that the first metric fails to meet a system health criteria due to a wireless connectivity failure between the first premises device and the wireless base station;

in response to determining that the first metric fails to meet the system health criteria, performing a first assessment, the first assessment comprising;
   determining a logical identifier of a wireless mesh network is no longer detectable;
   determining a medium access control (MAC) address associated with a logical identifier of a detectable wireless network;
   determining the MAC address of the detectable wireless network matches to a stored MAC address associated with the logical identifier of the wireless mesh network; and
   automatically connecting to the wireless mesh network using an updated logical identifier associated with the MAC address; and
determining a first action to implement to correct the wireless connectivity failure between the first premises device and the wireless base station based on the first assessment.

12. The method of claim 11, wherein the first action comprises modifying a setting of the premises security system to generate a modified setting, the modified setting being configured to correct the wireless connectivity failure between the first premises device and the wireless base station.

13. The method of claim 11, wherein the at least one metric comprises a second metric; and
the method further comprising:
   determining the second metric fails to meet the system health criteria, the second metric indicating a change in the wireless mesh network;
   in response to the determining that the second metric fails to meet the system health criteria, performing a second assessment of the premises security system by at least determining that a device of the premises security system has been added or removed to the wireless mesh network;
   determining a second action to implement to cause the second metric to meet the system health criteria, the second action comprising rebuilding a routing table for the wireless mesh network.

14. The method of claim 11, wherein the at least one metric comprises a frame error metric indicating a frame error rate in the wireless mesh network associated with the premises security system; and
the method further comprises:
   determining that the frame error metric fails to meet the system health criteria;
   in response to determining that the frame error metric fails to meet the system health criteria, performing a link assessment of the premises security system by at least determining that a communication link in the wireless mesh network is no longer operational; and
   determining a routing table action to implement to cause the frame error metric to meet the system health criteria, the routing table action comprising:
      logically removing the communication link from a routing table of the mesh network; and
      rebuilding the routing table of the wireless mesh network.

15. The method of claim 11, wherein the at least one metric comprises a power metric indicating a power level of a battery; and
the method further comprises:
   determining that the power metric fails to meet the system health criteria;
   in response to determining that the power metric fails to meet the system health criteria, performing a power assessment by at least:
      determining a power level of the battery has changed by a predefined amount; and
      determining an ambient temperature of the premises; and
   determining a power action to implement based on the power assessment.

16. The method of claim 15, wherein the power action comprises generating a notification indicating that the battery requires replacement.

17. The method of claim 11, wherein the first action comprises:
   generating a prompt for information associated with the first assessment; and
   modifying a setting of the premises security system based on the information.

18. The method of claim 17, wherein the at least one metric comprises a network noise metric that is configured to indicate a level of noise in the mesh network; and
the method further comprising:
   determining that the network noise metric fails to meet the system health criteria;
   in response to the determining that the network noise metric fails to meet the system health criteria, performing a network noise assessment of the premises security system; and
   determining a network noise action to implement to cause the network noise metric to meet the system health criteria.

19. The method of claim 11, wherein the logical identifier of the wireless mesh network is a service set identifier (SSID).

20. The method of claim 11, wherein the logical identifier of the wireless mesh network is a service set identifier (SSID).

* * * * *